United States Patent [19]

Ishikawa et al.

[11] Patent Number: 4,487,926

[45] Date of Patent: Dec. 11, 1984

[54] FLUORINE-CONTAINING CELLULOSE DERIVATIVES

[75] Inventors: Nobuo Ishikawa, Yokohama; Hiroki Taniguchi, Himeji, both of Japan

[73] Assignee: Daicel Chemical Industries, Ltd., Osaka, Japan

[21] Appl. No.: 570,205

[22] Filed: Jan. 12, 1984

[30] Foreign Application Priority Data

Jan. 12, 1983 [JP] Japan .................. 58-3955

[51] Int. Cl.³ .................. C08B 3/06; C08B 3/16; C08B 3/22

[52] U.S. Cl. .................. 536/82; 536/36; 536/83

[58] Field of Search .................. 536/36, 82, 83

[56] References Cited

U.S. PATENT DOCUMENTS 2,126,851  8/1938  Whitehead .................. 536/82

Primary Examiner—Ronald W. Griffin
Attorney, Agent, or Firm—Hubbell, Cohen, Stiefel & Gross

[57] ABSTRACT

A fluorine-containing cellulose derivative which is represented by the general formula:

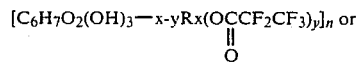

or

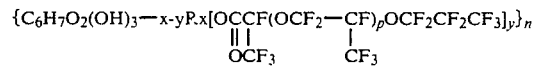

wherein R is acetyl group which may be partially replaced by propionyl or butyryl group, x is 1.7–2.5, y is 0.05–0.6, p is 0,1,2 or 3 and n is the degree of polymerization, to be usable for the material of fibers, moldings, films, semipermeable membranes, coatings or the like.

3 Claims, 5 Drawing Figures

FLUORINE-CONTAINING CELLULOSE DERIVATIVES

BACKGROUND OF THE INVENTION

1. Field of the Invention

The present invention relates to novel fluorine-containing cellulose derivatives, which can be used for fibers, moldings, films, semipermeable membranes, coatings or the like.

2. Description of the Prior Art

Cellulose acetate, one of the cellulose derivatives having many practically useful properties such as good molding characteristic, good solubility in solvents, good film-forming ability and good fiber-forming ability, is well utilized for fibers, moldings, films, semipermeable membranes and coatings. It is the same with cellulose acetate propionate, cellulose acetate butyrate or the like, which correspond to cellulose acetate whose acetyl groups are partially replaced by propionyl group, butyryl group or the like. These cellulose derivatives, however, have defects for specific use, which result from their highly hydrophilic property.

The most effective means for increasing hydrophobic property of a substance is to bond the substance with fluorine atoms or a fluorine-containing compound. However, reagents for introducing fluorine are generally too strong in reactivity and too difficult to deal with, and so it is not easy to introduce fluorine into the starting substance without losing characteristic properties thereof.

Recently, it has been found that hexafluoropropylene oxide (hereinafter abbreviated as HFPO) and its oligomer (hereinafter abbreviated as HFPO oligomer) are effective reagents for introducing fluorine into organic compounds.

The HFPO and HFPO oligomer are relatively easy to deal with and they are strong nucleophilic reagents. When cellulose derivatives were treated with them they reacted with hydroxyl groups of the cellulose derivatives to form ester linkages. Thus, fluorine could be introduced into cellulose derivatives by the reaction with them.

SUMMARY OF THE INVENTION

The inventors of the present invention have succeeded in synthesizing cellulose esters which have properties such as molding characteristic, film-forming ability, solubility in solvents, etc. by reacting a cellulose acetate having unsubstituted hydroxyl groups with the HFPO or HFPO oligomer.

Thus, the present invention provides fluorine-containing cellulose derivatives which are represented by the general formula:

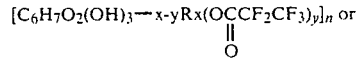

or

wherein R is an acetyl group which may be partially replaced by a propionyl or 1 butyryl group, x is 1.7–2.5, y is 0.05–0.6, p is 0, 1, 2 or 3 and n is the degree of polymerization.

DETAILED DESCRIPTION OF THE PREFERRED EMBODIMENTS

Figure 1:
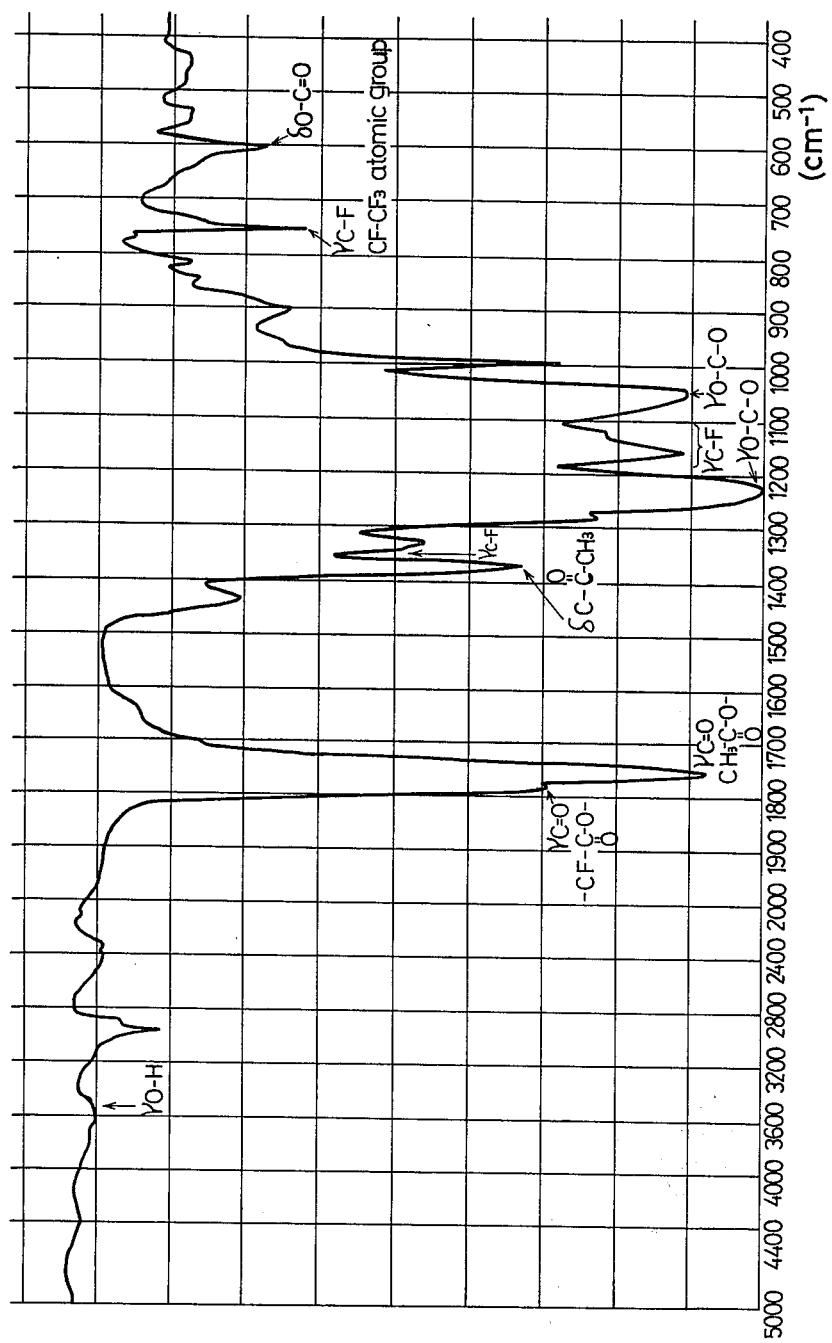
FIG. 1 shows an infrared absorption spectrum of the fluorine-containing cellulose derivative prepared by Example 1.

As the cellulose acetate used in the present invention, the so-called cellulose diacetate which is soluble in polar organic solvents having a lower boiling point, such as acetone, acetonitrile, methylene chloride and the like, and has unsubstituted hydroxyl groups is suitable. That is, cellulose acetates having a degree of substitution by acetyl group per anhydroglucose unit of the cellulose of more than 1.7 (inclusive) and less than 2.5 (inclusive) are preferred. Cellulose esters whose acetic acid esters are partially replaced by propionic acid esters or butyric acid esters, still within the same range of the degree of substitution, may also be used as the starting material. Further, other cellulose esters or cellulose ethers which are soluble in those organic solvents not having active hydrogen, such as acetone, and have unsubstituted hydroxyl groups, such as cellulose nitrate, methyl cellulose, hydroxybutyl cellulose and the like, may also be used as the starting material.

Synthesis of the fluorine-containing cellulose derivatives of the present invention may be carried out by dissolving a cellulose derivative as mentioned above in a solvent such as acetone and introducing HFPO or HFPO oligomer into the solution in the presence of a reaction catalyst.

For example, when cellulose acetate is made to react with HFPO, triethylamine is added to a solution of cellulose acetate in acetone and then HFPO is introduced into the solution. HFPO is isomerized in the presence of triethylamine and instantly reacts with the unsubstituted hydroxyl groups of cellulose acetate to form pentafluoropropionyl ester. The reaction would proceed according to the following scheme:

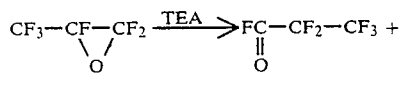

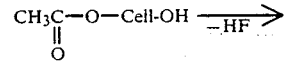

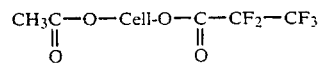

wherein —cell— represents cellulose residue. In this reaction, triethylamine is the catalyst for isomerization and acts also as the binding agent for hydrogen fluoride which is formed as by-product. Instead of triethylamine, amines such as trimethylamine, tripropylamine, pyridine, picoline ect. may be used.

In the case of HFPO oligomer, those oligomers prepared previously which have different boiling points according to the degrees of polymerization are first separated by distillation into each individual oligomer having unitary degree of polymerization, and the latter is used as the reagent.

For example, HFPO dimer is a liquid having a boiling point of 52°–56° C. which is soluble in acetone, and so by introducing it into a solution of cellulose acetate and triethylamine in acetone a fluorine-containing cellulose ester is formed similarly. The reaction would proceed according to the following scheme:

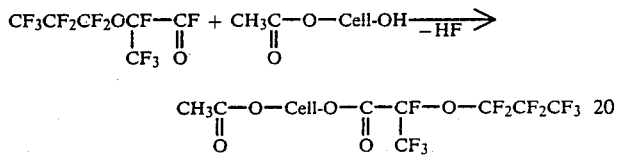

wherein —cell— represents cellulose residue.

As other HFPO oligomers used in the present invention, the followings can be mentioned:

|  | Boiling point |
| --- | --- |
| Trimer | 113–114° C., |
| Tetramer | 158–166° C., and |
| Pentamer | 135° C./9 mmHg. |

The reagent used in these reactions for introducing fluorine is used in an excessive molar amount relative to the mol number of unsubstituted hydroxyl groups in the cellulose acetate. For obtaining those fluorine-containing cellulose derivatives in which the substitution degree of unsubstituted hydroxyl groups by a fluorine-introducing reagent is low, for example, 0.05, the reagent is used in a slightly excessive amount, say, approximately 1–2 times mol, i.e. 0.06 mol. On the other hand, for obtaining cellulose derivatives having a high substitution degree, the fluorine-introducing reagent is used in a highly excessive amount (2–6 times mol). The above reactions are generally carried out at 0°–60° C. for 1–16 hours.

With the reaction products obtained by these reactions, elementary analysis values, infrared absorption spectrum and nuclear megnetic resonance spectrum were determined. The results obtained were sufficient to prove that the products were fluorine-containing cellulose derivatives in which the unsubstituted hydroxyl groups of cellulose acetate formed new ester linkages.

The novel fluorine-containing cellulose derivatives of the present invention have good solubility in solvents and good film-forming ability and are expected to be used as fibers, gas-separating membranes, coating agents, modifier, polymer materials for medical use, and the like.

The present invention is further illustrated by giving Examples, hereinafter. However, it should be noted that the invention is not limited to these Examples.

EXAMPLE 1

Cellulose acetate (degree of substitution by acetyl group: 2.38, degree of polymerization: approx. 200) (0.5 g) was dissolved in acetone (35 ml) and charged in a reaction tube. Triethylamine (1 ml) and HFPO dimer (boiling point 52°–53° C.) (1.35 ml) were added to the solution, and the reaction was carried out at room temperature for 8 hours. A large amount of water (approx. 500 ml) was added to the reaction mixture, and the precipitates formed were separated by filtration (glass filter: 3 G). The precipitates were washed twice with water and twice with ether, and then reprecipitated from acetone/water. After washing and drying, a white flaky substance was obtained.

Physical and chemical properties of the product are shown below.

Solubility:

The product is soluble in acetone, ethyl acetate, methylene chloride, dioxane, acetic acid and trifluoroacetic anhydride, and insoluble in dimethylformamide, dimethyl sulfoxide, chloroform, trichloroethylene and Daiflon solvent (a product of Daikin Kogyo Co., Ltd. in Japan).

Figure 2:
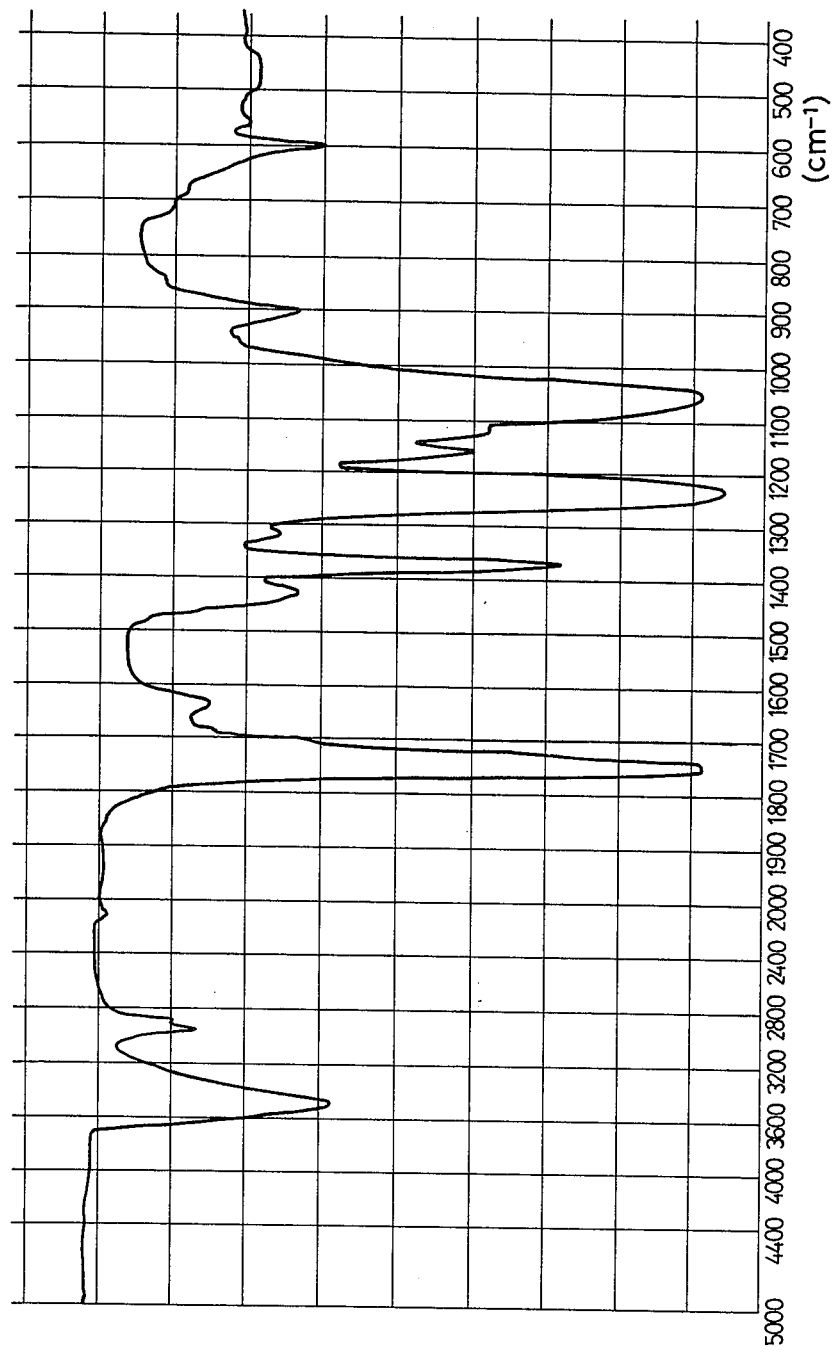
FIG. 2 shows an infrared absorption spectrum of the cellulose acetate used as the starting material in Examples 1 to 5.

Infrared absorption spectrum:

The spectrum of the product, which is determined using a film obtained by flow-extension on glass plate of a solution of said product in methylene chloride, is shown in FIG. 1. The spectrum of cellulose acetate used as the starting material is shown in FIG. 2.

In FIG. 1, the absorption at 750 cm$^{-1}$ to $\nu$C—F in the atomic group —CF—CF$_3$, the absorptions at 1160 cm$^{-1}$ and 1340 cm$^{-1}$ to $\nu$C—F, and the absorption (shoulder) at 1780 cm$^{-1}$ to $\nu$C=O in the atomic group

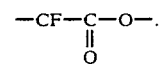

The absorption at 3600 cm$^{-1}$, which is observed in the spectrum of cellulose acetate and attributed to $\nu$OH, has disappeared practically from the FIG. 1.

19F-Nuclear magnetic resonance absorption spectrum:

The magnetic resonance absorption spectrum of nucleus 19F was determined using Hitachi's NMR spectrometer R 24 F. The sample was dissolved in acetone, and trifluoroacetic acid was used as the internal standard. The frequency was 60 MHz.

At first, the absorption spectrum of HFPO dimer was measured. Absorptions were observed near −100.9 ppm(a), 7.7 ppm(b) and 59.7 ppm(c), and the ratio of integrated strength of them was 1:8:3. Therefore, each absorption can be attributed as follows:

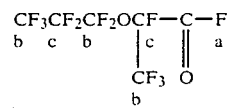

a:b:c = 1:8:3.

Next, the measurement was effected with the reaction product of Example 1. Absorptions were observed near +3.7 ppm and 52.3 ppm, and the ratio of integrated strength of them was approximately 8:3. Further, the peak attributed to CF adjacent to carbonyl group was observed at 53–55 ppm and the peak for the terminal CF$_3$ was observed at 5–7 ppm.

Elementary analysis:

Using Yanagimoto's CHN Corder, type MT-2, CHN analysis was effected. The result was C=39.95%.

This numerical value corresponds to the substitution degree of HFPO dimer of approx. 0.47.

Putting the above-mentioned physical and chemical data together, it is considered that, of approx. 0.6 unsubstituted hydroxyl groups in the cellulose acetate having a substitution degree by acetyl group of approx. 2.4, approx., 0.5 has formed ester linkage with HFPO dimer, in the product of Example 1.

EXAMPLE 2

The same cellulose acetate as used in Example 1 (0.5 g) was dissolved in acetone (35 ml) and charged in a pressure-resistant reaction tube. After adding triethylamine (1 ml), the solution was cooled at $-25°$ C. Then, HFPO monomer (2.5 ml) cooled below its boiling point ($-27°$ C.) was charged in the reaction tube, and the temperature of the reaction mixture was allowed to elevate spontaneously while stirring. The reaction was continued for 8 hours, at room temperature. The reaction mixture was added into a large amount of water while stirring, and the resulting precipitates were separated by filtration (glass filter: 3G). The precipitates were washed twice with water and twice with ether, and then reprecipitated from acetone/water. After washing and drying, a white flaky substance was obtained.

Physical and chemical properties of the product are shown below.

Solubility:

The solubility of the product was almost the same as that of the product of Example 1.

Figure 3:
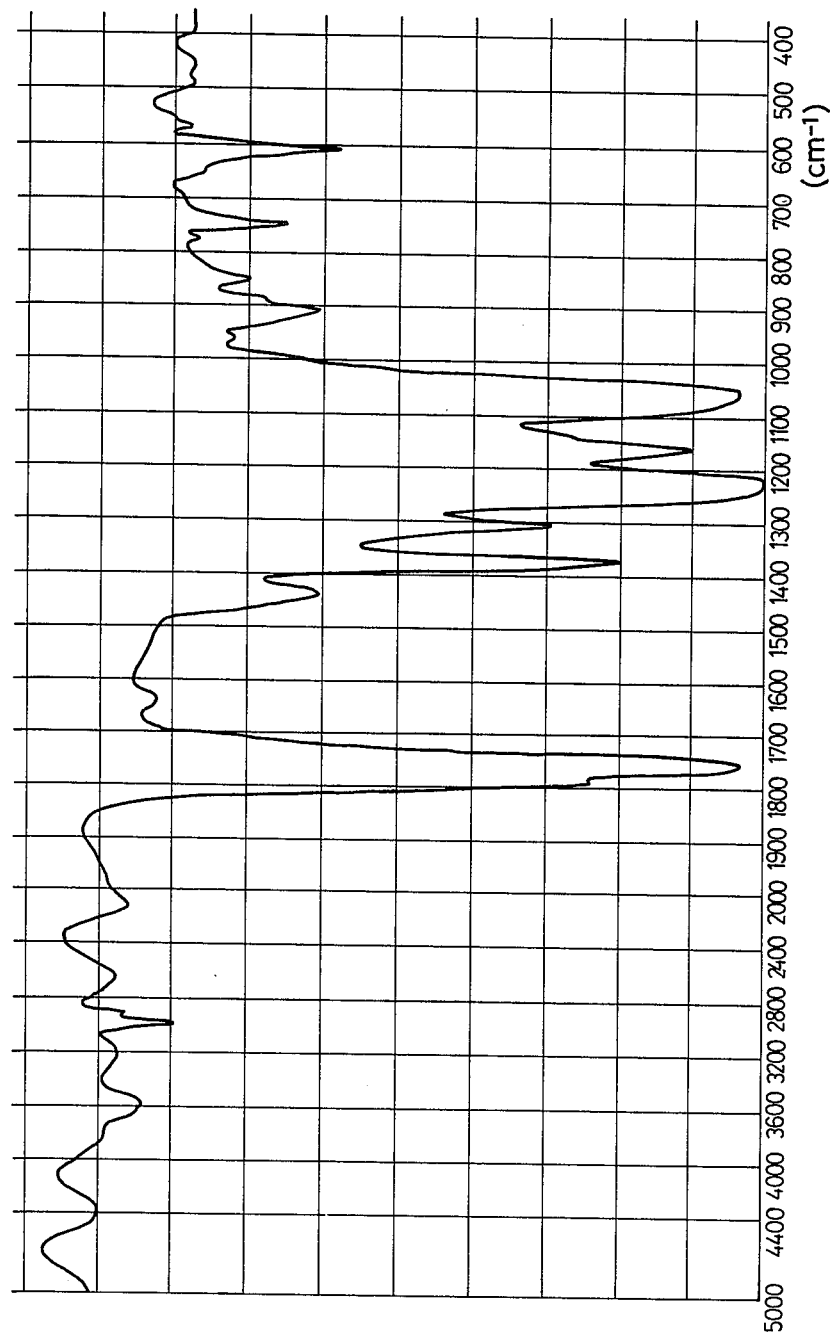
FIG. 3 and FIG. 4 show infrared absorption spectra of the fluorine-containing cellulose derivatives prepared by Example 2 and Example 3, respectively.

Infrared absorption spectrum:

The infrared absorption spectrum determined according to the film method is shown in FIG. 3.

In FIG. 3, the absorption at 750 cm$^{-1}$ is attributed to $\nu$C—F in the atomic group —CF—CF$_3$ and the absorption at 1785 cm$^{-1}$ is attributed to $\nu$C=O of the atomic group

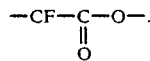

The absorption at 3500–3600 cm$^{-1}$, which is observed in FIG. 2 and attributed to $\nu$OH, has disappeared practically from the FIG. 3.

19F-Nuclear magnetic resonance absorption spectrum:

Absorptions were observed at 5.3 ppm and 43.3 ppm, and the ratio of integrated strength of them was approximately 3:2. It is considered that the former is attributed to the fluorine bonded to the $\beta$ carbon of pentafluoropropionyl group (CF$_3$—) and the latter to the fluorine bonded to the $\alpha$ carbon

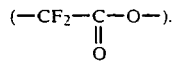

Elementary analysis:

The result of CH analysis showed that C=42.97% and H=4.05%. As calculated from the C-content, the degree of substitution by pentafluoropropionyl group per anhydroglucose unit was 0.63.

From the data as mentioned above, it is considered that almost all of the unsubstituted hydroxyl group (approx. 0.6) in the cellulose acetate having a substitution degree of acetyl group of approx. 2.4 has formed pentafluoropropionyl ester linkage, in the product of Example 2.

EXAMPLE 3

The same cellulose acetate as used in Example 1 (0.5 g) was dissolved in acetone (35 ml), and the same procedure as carried out in Example 1 was pursued except that HFPO trimer (boiling point 113°–114° C.) (2.0 ml) was added to the solution instead of HFPO dimer. The reaction product thus obtained from cellulose acetate and HFPO trimer showed almost the same behavior against solvents as the product of Example 1 which was obtained from cellulose acetate and HFPO dimer.

Figure 4:
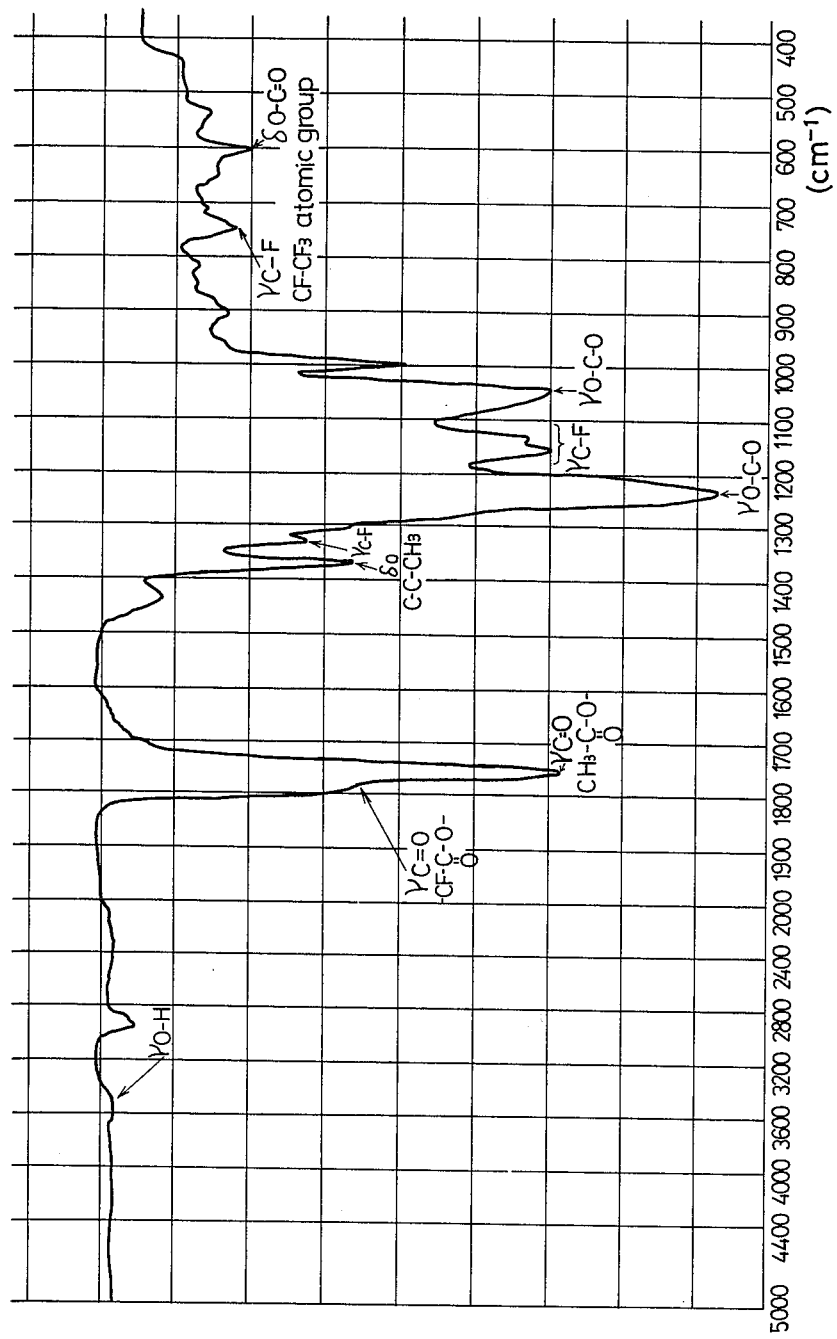

Infrared absorption spectrum of a film obtained by flow-extension of a solution of the product in methylene chloride is shown in FIG. 4. The position of the absorption maximum indicating the specific absorption is practically the same as that of the product from cellulose acetate and HFPO dimer shown in FIG. 2.

The result of elementary analysis of the product showed that C=39.10% by weight. As calculated from this value, the degree of substitution by HFPO trimer is 0.34.

EXAMPLE 4

The same procedure as Example 1 was pursued except that HFPO tetramer (boiling point 158°–166° C.) (2.70 ml) was used instead of HFPO dimer. Infrared absorption spectrum of the reaction product was determined according to the KBr tablet method. Specific absorptions were observed at 750 cm$^{-1}$ ($\nu$C—F), 1240 cm$^{-1}$ ($\nu$C—O—C), 1760 cm$^{-1}$ ($\nu$C=O in ester group), 1800 cm$^{-1}$ ($\nu$C=O in ester group adjacent to —CF—), and others. Elementary analysis of the reaction product showed that C=37.90%. As calculated from this value, the degree of substitution by HFPO tetramer is 0.30.

EXAMPLE 5

The same procedure as Example 1 was pursued except that HFPO pentamer (boiling point 135° C./9 mmHg) (3.50 ml) was used instead of HFPO dimer. Infrared absorption spectrum of the reaction product was determined according to the KBr tablet method. The position of the specific absorptions was practically the same as that of the product obtained from cellulose acetate and HFPO tetramer in Example 4.

Elementary analysis of the reaction product showed that C=37.72%. As calculated from this value, the degree of substitution by HFPO pentamer is 0.24.

EXAMPLE 6

Flow-extension film was prepared from each of cellulose acetate and the reaction products from cellulose acetate and a HFPO oligomer as obtained in Examples 1, 3, 4 and 5. A liquid drop of each of those solvents having different surface tension was placed on each film, and the contact angle ($\theta$) of the liquid drop was measured with ERMA contact goniometer. The solvents used for the measurement were n-decane (C$_{10}$), n-dodecane (C$_{12}$), n-tetradecane (C$_{14}$), n-hexadecane (C$_{16}$), dioxane and ethylene glycol.

Figure 5:
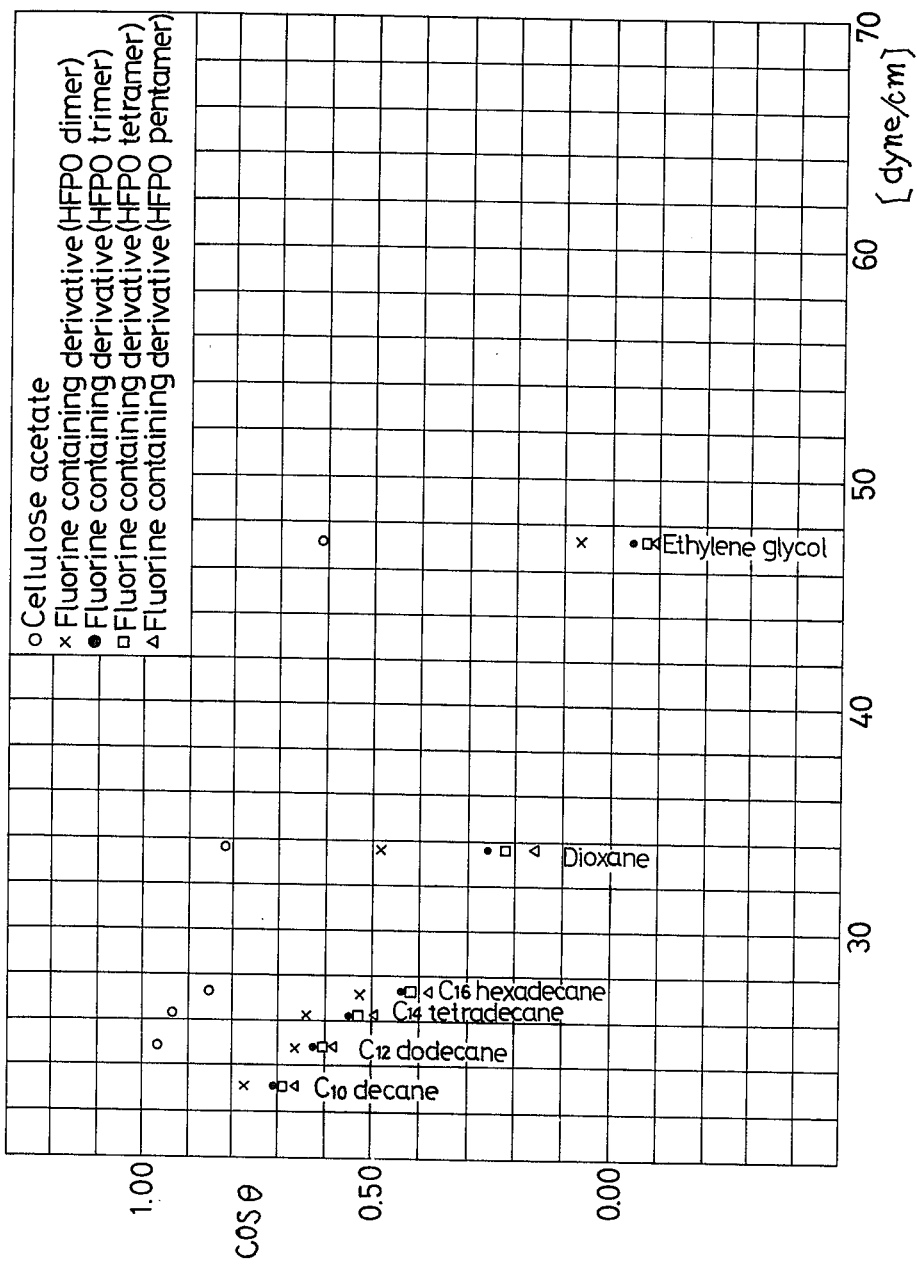
FIG. 5 is a graph showing the relations between surface tensions of various solvents and their contact angles to the cellulose acetate and the cellulose derivatives prepared by Examples 1, 3, 4 and 5.

The relation between surface tension and contact angle of each solvent is shown in FIG. 5. It is recognized that the reaction products of cellulose acetate and each HFPO oligomer are more hydrophobic, compared with cellulose acetate, and the reaction products have those surface properties which are mutually approximate.

By the way, the degree of acetylation (the amount of bonded acetic acid) and the degree of polymerization of cellulose acetate used as the starting material were determined according to the methods described below, and the degree of substitution by acetyl group of the cellulose acetate was calculated from the numerical value of said degree of acetylation according to the formula described below:

(1) Degree of acetylation (Amount of bonded acetic acid)

A sample (approx. 1.0 gr.) is dried according to the same method as that is employed in the analysis of water content, weighed accurately, and transferred into an Erlenmeyer flask provided with ground stopper having 300 ml volume. Then, 75% neutral alcohol (40 ml) is added to the sample and the flask is dipped for 30 minutes in a thermostatic water bath held at $55\pm5°$ C. After addition of 0.5N-NaOH solution (40 ml), the flask is further dipped for 15 minutes in the thermostatic water bath held at $55\pm5°$ C. After setting the stopper tightly, the flask is allowed to stand for 40–48 hours at $25\pm5°$ C. Titration with 0.5N-HCl is effected using phenolphthalein as indicator and 0.5N-HCl is added in excess by 5 mal. Further, back titration is effected with 0.5N-NaOH solution. It is stopped at the point when pale rose-color appears. Degree of acetylation is calculated according to the following formula:

(Blank test is also effected in parallel.)

Degree of acetylation $y\% = \dfrac{\frac{1}{2}\{a(A-A')-b(B-B')\}\times 6.005}{\text{amount of dry sample(gr.)}}$ (Amount of bonded acetic acid)
wherein
 a: factor of 0.5N-NaOH solution
 A: titer(ml) of 0.5N-NaOH solution used for sample
 A': titer(ml) of 0.5N-NaOH solution required in blank test
 b: factor of 0.5N-HCl
 B: titer(ml) of 0.5N-HCl used for sample
 B': titer(ml) of 0.5N-HCl required in blank test.

(2) Degree of substitution by acetyl group

Degree of substitution by acetyl group (x%) is calculated from the degree of acetylation (y%) described above, according to the following formula:

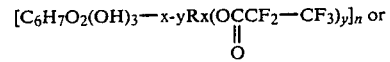
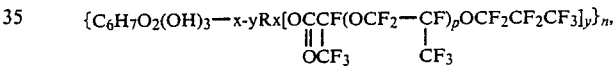

(3) Degree of polymerization

Pulverized sample (approx. 0.2 g) is dried at 100°–105° C. for 2 hours, and left to cool in a desiccator for 40 minutes. After weighing accurately, the dry sample is completely dissolved in acetone (50 ml). The temperature of the solution is adjusted at $25.0\pm0.1°$ C., and the solution is transferred into a viscometer to measure the seconds of flowing-down. Degree of polymerization is calculated according to the following formula:

$\eta\text{rel} = t/to$ $[\eta] = (\ln \eta\text{rel})/c$ wherein
 t: seconds of flowing-down for solution,
 to: seconds of flowing-down for solvent,
 C: concentration (g/l).

$P = [\eta]Km$ $Km = 9\times 10^{-4}$

What is claimed is:

1. A fluorine-containing cellulose derivative having the general formula:

$$[C_6H_7O_2(OH)_{3-x-y}R_x(\underset{\underset{O}{\|}}{O}CCF_2-CF_3)_y]_n \text{ or}$$

$$\{C_6H_7O_2(OH)_{3-x-y}R_x[\underset{\underset{OCF_3}{\|\,|}}{O}CCF(OCF_2-\underset{\underset{CF_3}{|}}{C}F)_pOCF_2CF_2CF_3]_y\}_n,$$

wherein R is acetyl group which may be partially replaced by propionyl or butyryl group, x is 1.7–2.5, y is 0.05–0.6, p is 0,1,2 or 3 and n is the degree of polymerization.

2. A fluorine-containing cellulose derivative as claimed in claim 1 wherein R is acetyl group.

3. A fluorine-containing cellulose derivative as claimed in claim 1 wherein x is 2.0–2.4 and y is 0.2–0.6.

* * * * *